United States Patent
Liu et al.

(10) Patent No.: US 11,381,440 B2
(45) Date of Patent: Jul. 5, 2022

(54) METHOD AND DEVICE IN BASE STATION FOR UNLICENSED SPECTRUM

(71) Applicants: Zheng Liu, Shanghai (CN); Xiaobo Zhang, Shanghai (CN)

(72) Inventors: Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 100 days.

(21) Appl. No.: 15/931,620

(22) Filed: May 14, 2020

(65) Prior Publication Data

US 2020/0274749 A1    Aug. 27, 2020

Related U.S. Application Data

(63) Continuation of application No. PCT/CN2017/113311, filed on Nov. 28, 2017.

(51) Int. Cl.
| | |
|---|---|
| *H04L 27/26* | (2006.01) |
| *H04W 16/14* | (2009.01) |
| *H04L 1/18* | (2006.01) |
| *H04W 72/12* | (2009.01) |

(52) U.S. Cl.
CPC ........ *H04L 27/2627* (2013.01); *H04L 1/1812* (2013.01); *H04W 72/1273* (2013.01); *H04W 16/14* (2013.01)

(58) Field of Classification Search
CPC ............. H04L 27/2627; H04L 1/1812; H04W 72/1278; H04W 16/14
See application file for complete search history.

(56) References Cited

U.S. PATENT DOCUMENTS

| | | | |
|---|---|---|---|
| 2013/0223364 A1* | 8/2013 | Akkarakaran | ........ H04W 72/04 370/329 |
| 2016/0095018 A1 | 3/2016 | Vajapeyam | |

(Continued)

FOREIGN PATENT DOCUMENTS

| | | |
|---|---|---|
| CN | 105722234 A | 6/2016 |
| CN | 106559797 A | 4/2017 |
| CN | 107294662 A | 10/2017 |
| WO | 2017069798 A | 4/2017 |

OTHER PUBLICATIONS

1st Office Action received in application No. 201780094796.3 dated Aug. 24, 2020.

(Continued)

*Primary Examiner* — Christopher M Crutchfield
*Assistant Examiner* — Tito Q Pham

(57) ABSTRACT

The present disclosure provides a method and a device in a base station used for Unlicensed Spectrum. The base station first transmits K1 radio signals in a reference time window and then receives K1 HARQ feedbacks, and performs Q1 energy detections respectively in Q1 time sub-pools on a first frequency sub-band; the K1 HARQ feedbacks are respectively used for determining whether the K1 radio signals are correctly received; a first radio signal is a radio signal of the K1 radio signals, the first radio signal carries part of bits comprised by a first bit block; a first HARQ feedback is used for determining whether the first radio signal is correctly received, HARQ feedback(s) other than the first HARQ feedback among the K1 HARQ feedbacks is(are) used for determining the Q1 time sub-pools. The present disclosure increases the chance of access to Unlicensed Spectrum and the utilization ratio of spectrum resources.

20 Claims, 11 Drawing Sheets

(56) References Cited

U.S. PATENT DOCUMENTS

| | | | |
|---|---|---|---|
| 2018/0062796 A1* | 3/2018 | Feng | H04L 1/1812 |
| 2018/0132198 A1* | 5/2018 | Zhang | H04W 72/0453 |
| 2018/0287744 A1* | 10/2018 | Sundararajan | H04L 1/1819 |
| 2018/0324816 A1* | 11/2018 | Islam | H04W 72/085 |
| 2018/0368176 A1* | 12/2018 | Sun | H04L 5/0055 |
| 2019/0098612 A1* | 3/2019 | Babaei | H04W 72/1289 |
| 2020/0059327 A1* | 2/2020 | Kini | H04W 72/042 |
| 2020/0196335 A1* | 6/2020 | Lei | H04L 1/1671 |
| 2020/0374040 A1* | 11/2020 | Lou | H04L 1/1812 |
| 2021/0127407 A1* | 4/2021 | Shapin | H04L 47/80 |
| 2021/0168836 A1* | 6/2021 | Takeda | H04L 1/1835 |
| 2021/0289488 A1* | 9/2021 | Cheng | H04W 72/0413 |

OTHER PUBLICATIONS

M.U.Hadi Extending the benefits of LTE to unlicensed spectrum «2015 International Conference on Information and Communication Technologies(ICICT)».

1st Search Report in application No. 201780094796.3 dated Aug. 18, 2020.

The extended European search report in application 17933483.4 dated Oct. 21, 2020.

Qualcomm Incorporated: "Use cases of multi-bit HARQ-ACK feedback", 3GPPDRAFT; R1-1708633 Use Cases of Multi-Bit HARQ-ACK Feedback,3rd Generation Partnership Project(3GPP), Mobile Competence Centre ;650,Route des Lucioles;F-06921 Sophia-Antipolis Cedex; France.

First Office Action from India received in application No. IN202017023612 dated Jun. 25, 2021.

* cited by examiner

| Priority level | Number of time sub-pools | Candidate integer set |
|---|---|---|
| 1 | 1 | {3, 7} |
| 2 | 1 | {7, 15} |
| 3 | 3 | {15, 31, 63} |
| 4 | 7 | {15, 31, 63, 127, 255, 511, 1023} |

FIG. 9

METHOD AND DEVICE IN BASE STATION FOR UNLICENSED SPECTRUM

CROSS REFERENCE TO RELATED APPLICATIONS

This application is a continuation of International Application No. PCT/CN2017/113311, filed on Nov. 28, 2017, claiming the priority benefit of International Application PCT/CN2017/113311, filed on Nov. 28, 2017, the full disclosure of which is incorporated herein by reference.

BACKGROUND

Technical Field

The present disclosure relates to transmission methods and devices in wireless communication systems, and in particular to a scheme and device of transmission on unlicensed spectrum.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary session decided to conduct the study of New Radio (NR), or what is called fifth Generation (5G). The work Item (WI) of NR was approved at the 3GPP RAN #75 plenary session to standardize the NR.

To adapt to a variety of application scenarios and meet different requirements, a study item (SI) of NR Unlicensed Spectrum was also approved at the 3GPP RAN #75th plenary session. The SI was expected to be completed in R15 and a Work Item (WI) will be initiated in R16 to standardize relevant techniques.

SUMMARY

In the Long Term Evolution (LTE) License Assisted Access (LAA) item, an LTE base station (eNB) performs Listen Before Talk (LBT) on unlicensed frequency domain so as to ensure that the Unlicensed Spectrum is available prior to downlink transmission. In Cat 4 LBT (refer to 3GPP TR36.889 for the meaning of Cat 4 LBT) process, the transmitter (i.e., a base station, if in downlink transmission) experiences backoff in a certain defer duration, in which the backoff time is calculated based on a unit of Clear Channel Assessment (CCA) slot, and the number of slots of the backoff is obtained by random selection of the transmitter within a contention window size (CWS). The CWS is adjusted according to a Hybrid Automatic Repeat Request (HARQ) ACK in a previous transmission on the Unlicensed Spectrum.

In 5G NR standardization, in order to enhance resource utilization and support Ultra Reliable Low Latency Communication (URLLC) traffic, HARQ ACK based on Code block Group (CBG) and URLLC transport block will be supported in pre-emption of resources in another transmission. When Unlicensed Spectrum is employed, a new method of adjusting CWS needs to be redesigned.

To address the issue of CWS adjustment on NR Unlicensed Spectrum, the present disclosure provides a solution. It should be noted that if no conflict is incurred, the embodiments of the base station of the present disclosure and the characteristics in the embodiments may be applied to a User Equipment (UE), and vice versa. Further, the embodiments of the present disclosure and the characteristics in the embodiments may be mutually combined if there is no conflict.

The present disclosure provides a method in a base station for wireless communications, comprising:

transmitting K1 radio signals in a first reference time window;

receiving K1 HARQ feedbacks; and performing Q1 energy detections respectively in Q1 time sub-pools on a first frequency sub-band;

herein, the K1 HARQ feedbacks are respectively used for determining whether the K1 radio signals are correctly received; a first radio signal is one radio signal of the K1 radio signals, the first radio signal carries part of bits comprised by a first bit block; a first HARQ feedback is used for determining whether the first radio signal is correctly received, HARQ feedback(s) other than the first HARQ feedback among the K1 HARQ feedbacks is(are) used for determining the Q1 time sub-pools, both the K1 and the Q1 are positive integers greater than 1.

In one embodiment, the above method is characterized in that the first bit block is used for generating X1 modulation symbols, the X1 modulation symbols respectively correspond to X1 resource elements, the first radio signal occupies X2 resource elements out of the X1 resource elements, the first radio signal is generated by X2 modulation symbols out of the X1 modulation symbols that correspond to the X2 resource elements, the X2 is a positive integer, and the X1 is a positive integer greater than the X2.

According to one aspect of the present disclosure, the above method is characterized in further comprising:

transmitting a second radio signal in a first time window;

herein, an end of the first time window is earlier than a start of the reference time window, M1 code blocks are used for generating the second radio signal, the M1 is a positive integer greater than 1, each code block of the M1 code blocks comprises a positive integer number of bit(s), the M1 code blocks belong to a same transport block; among the M1 code blocks only M2 code block(s) is(are) used for generating the first radio signal, the M2 is a positive integer less than the M1.

According to one aspect of the present disclosure, the above method is characterized in that HARQ feedback(s) other than the first HARQ feedback among the K1 HARQ feedbacks is(are) used for determining K2 candidate integers; Q2 is a candidate integer of the K2 candidate integers, the Q1 time sub-pools comprise Q2 time sub-pools; each energy detection of Q2 energy detections performed by the base station in the Q2 time sub-pools is lower than a first threshold.

According to one aspect of the present disclosure, the above method is characterized in that the Q1 time sub-pools comprise a first time sub-pool and Q3 time sub-pool(s), the first time sub-pool is an earliest time sub-pool of the Q1 time sub-pools, the Q3 time sub-pool(s) is(are) contiguous time sub-pool(s) out of the Q1 time sub-pools that is(are) adjacent to the first time sub-pool, the first time sub-pool and each time sub-pool of the Q3 time sub-pool(s) are time sub-pools outside the Q2 time sub-pools, of all energy detections performed by the base station in the first time sub-pool and the Q3 time sub-pool(s) there is one energy detection that is not lower than the first threshold, the Q3 is a positive integer.

According to one aspect of the present disclosure, the above method is characterized in further comprising:

transmitting a third radio signal;

herein, a start time for a transmission of the third radio signal is an end time for the Q1 time sub-pools.

According to one aspect of the present disclosure, the above method is characterized in that the K2 is a positive integer comprised by a first integer set, the first integer set comprises a positive integer number of positive integer(s), a priority level corresponding to the third radio signal is used for determining the first integer set and the Q3.

According to one aspect of the present disclosure, the above method is characterized in that HARQ feedback(s) other than the first HARQ feedback among the K1 HARQ feedbacks comprises (comprise) K3 negative feedback(s), the K3 is a positive integer less than the K1; when a ratio of the K3 to the K1 is no less than a target ratio, the K2 is equal to a minimum integer comprised by the first integer set that is greater than K0, the K0 is an integer comprised by the first integer set, and the K0 is used for determining a start of the reference time window, the target ratio is pre-defined.

The present disclosure provides a base station for wireless communications, comprising:

a first transmitter, transmitting K1 radio signals in a reference time window;

a first receiver, receiving K1 HARQ feedbacks; and a second receiver, performing Q1 energy detections respectively in Q1 time sub-pools on a first frequency sub-band;

herein, the K1 HARQ feedbacks are respectively used for determining whether the K1 radio signals are correctly received; a first radio signal is one radio signal of the K1 radio signals, the first radio signal carries part of bits comprised by a first bit block; a first HARQ feedback is used for determining whether the first radio signal is correctly received, HARQ feedback(s) other than the first HARQ feedback among the K1 HARQ feedbacks is(are) used for determining the Q1 time sub-pools, both the K1 and the Q1 are positive integers greater than 1.

According to one aspect of the present disclosure, the above base station is characterized in that the first bit block is used for generating X1 modulation symbols, the X1 modulation symbols respectively correspond to X1 resource elements, the first radio signal occupies X2 resource elements out of the X1 resource elements, the first radio signal is generated by X2 modulation symbols out of the X1 modulation symbols that correspond to the X2 resource elements, the X2 is a positive integer, and the X1 is a positive integer greater than the X2.

According to one aspect of the present disclosure, the above base station is characterized in that a first transmitter also transmits a second radio signal in a first time window; herein, an end of the first time window is earlier than a start of the reference time window, M1 code blocks are used for generating the second radio signal, the M1 is a positive integer greater than 1, each code block of the M1 code blocks comprises a positive integer number of bit(s), the M1 code blocks belong to a same transport block; among the M1 code blocks only M2 code block (s) is(are) used for generating the first radio signal, the M2 is a positive integer less than the M1.

According to one aspect of the present disclosure, the above base station is characterized in that HARQ feedback(s) other than the first HARQ feedback among the K1 HARQ feedbacks is(are) used for determining K2 candidate integers; Q2 is a candidate integer of the K2 candidate integers, the Q1 time sub-pools comprise Q2 time sub-pools; each energy detection of Q2 energy detections performed by the base station in the Q2 time sub-pools is lower than a first threshold.

According to one aspect of the present disclosure, the above base station is characterized in that the Q1 time sub-pools comprise a first time sub-pool and Q3 time sub-pool(s), the first time sub-pool is an earliest time sub-pool of the Q1 time sub-pools, the Q3 time sub-pool(s) is(are) contiguous time sub-pool(s) out of the Q1 time sub-pools that is(are) adjacent to the first time sub-pool, the first time sub-pool and each time sub-pool of the Q3 time sub-pool(s) are time sub-pools outside the Q2 time sub-pools, of all energy detections performed by the base station in the first time sub-pool and the Q3 time sub-pool(s) there is one energy detection that is not lower than the first threshold, the Q3 is a positive integer.

According to one aspect of the present disclosure, the above base station is characterized in that the first transmitter also transmits a third radio signal; herein, a start time for a transmission of the third radio signal is an end time for the Q1 time sub-pools.

According to one aspect of the present disclosure, the above base station is characterized in that the K2 is a positive integer comprised by a first integer set, the first integer set comprises a positive integer number of positive integer(s), a priority level corresponding to the third radio signal is used for determining the first integer set and the Q3.

According to one aspect of the present disclosure, the above base station is characterized in that HARQ feedback(s) other than the first HARQ feedback among the K1 HARQ feedbacks comprises (comprise) K3 negative feedback(s), the K3 is a positive integer less than the K1; when a ratio of the K3 to the K1 is no less than a target ratio, the K2 is equal to a minimum integer comprised by the first integer set that is greater than K0, the K0 is an integer comprised by the first integer set, and the K0 is used for determining a start of the reference time window, the target ratio is pre-defined.

In one embodiment, the present disclosure is advantageous in the following aspects:

In the process of LBT in downlink transmission on Unlicensed Spectrum, in view of the fact that a HARQ feedback of transmission pre-empted is excluded from the CWS adjustment, the method in the present disclosure is used so as to enable the CWS adjustment to reflect the channel occupancy more accurately, thus enhancing the chance of access and further increase resource utilization ratio on Unlicensed Spectrum.

In view of the fact that a HARQ feedback of a CBG in a TB is excluded from the CWS adjustment, the method in the present disclosure is used so as to avoid repetitious calculations of HARQ feedbacks by CWS adjustment, thereby reflecting the channel occupancy more accurately and further increasing the chance of access and spectrum utilization ratio.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

FIG. 9 illustrates a schematic diagram of a first integer set and Q3 according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
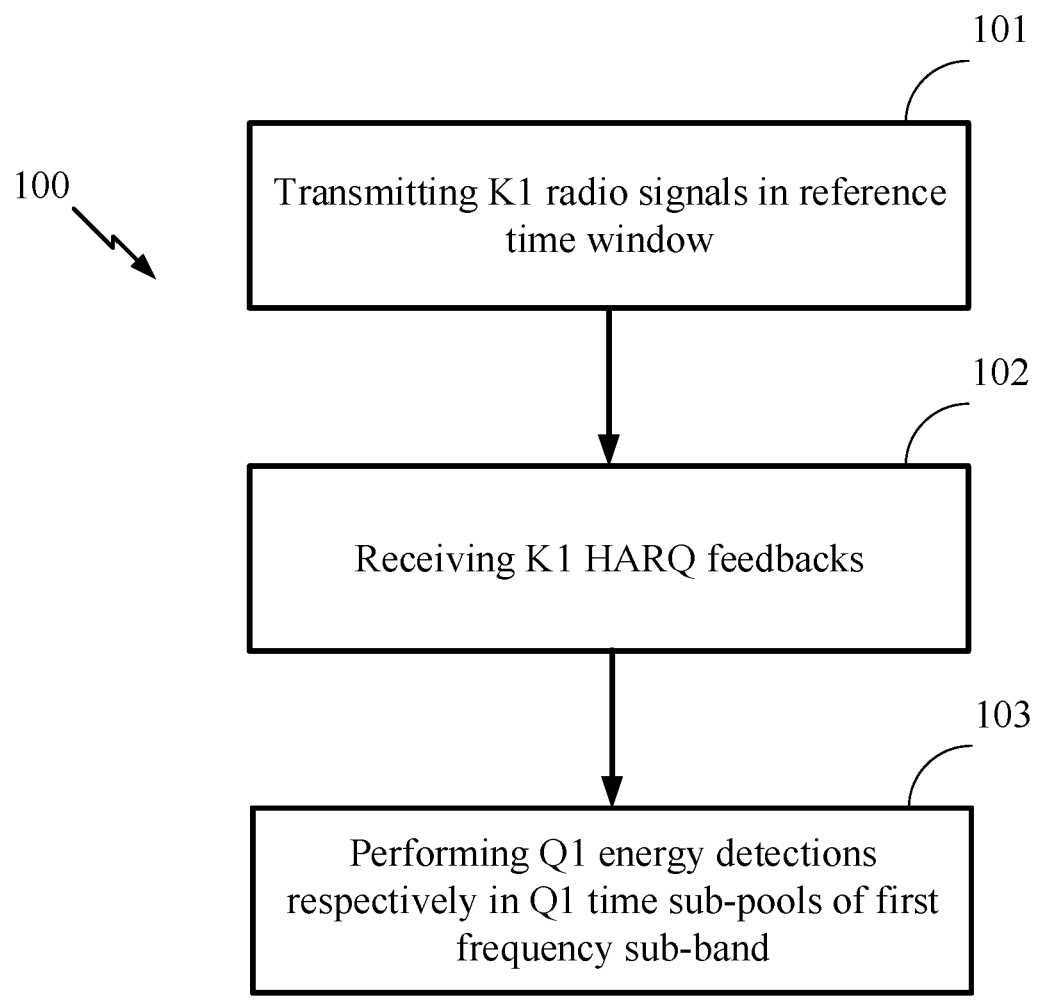
FIG. 1 illustrates a flowchart of transmission of K1 radio signals and K1 HARQ feedbacks according to one embodiment of the present disclosure.

Embodiment 1 illustrates a flowchart of K1 radio signals and K1 HARQ feedbacks according to one embodiment of the present disclosure, as shown in FIG. 1. In FIG. 1, each box represents a step. In Embodiment 1, the UE in the present disclosure first transmits K1 radio signals in a reference time window; and receives K1 HARQ feedbacks; and then performs Q1 energy detections respectively in Q1 time sub-pools of a first frequency sub-band; herein, the K1 HARQ feedbacks are respectively used for determining whether the K1 radio signals are correctly received; a first radio signal is one radio signal of the K1 radio signals, the first radio signal carries part of bits comprised by a first bit block; a first HARQ feedback is used for determining whether the first radio signal is correctly received, HARQ feedback(s) other than the first HARQ feedback among the K1 HARQ feedbacks is(are) used for determining the Q1 time sub-pools, both the K1 and the Q1 are positive integers greater than 1.

In one embodiment, one of the energy detections means that the base station monitors a received power in a given time unit, the given time unit belongs to one time sub-pool of the Q1 time sub-pools.

In one embodiment, one of the energy detections means that the base station monitors a received energy in a given time unit, the given time unit belongs to one time sub-pool of the Q1 time sub-pools.

In one embodiment, one of the energy detections means that the base station senses all radio signals on a given frequency-domain resource in a given time unit so as to obtain a given power; the given frequency-domain resource is the first frequency sub-band; the given time unit belongs to one time sub-pool of the Q1 time sub-pools.

In one embodiment, one of the energy detections means that the base station senses all radio signals on a given frequency-domain resource in a given time unit so as to obtain a given energy; the given frequency-domain resource is the first frequency sub-band; the given time unit belongs to one time sub-pool of the Q1 time sub-pools.

In one embodiment, the energy detections are realized through a method as defined in 3GPP TS36.213, section 15.

In one embodiment, the energy detections are realized through a method of energy detection in LTE LAA.

In one embodiment, the energy detections are energy detections in LBT.

In one embodiment, the energy detections are realized through a method of energy detection in WiFi.

In one embodiment, the energy detections are realized through measuring a Received Signal Strength Indication (RSSI).

In one embodiment, the first frequency sub-band is deployed on Unlicensed Spectrum.

In one embodiment, the Q1 energy detections are measured by dBm.

In one embodiment, the Q1 energy detections are measured by milliwatt (mW).

In one embodiment, the Q1 energy detections are measured by Joule (J).

In one embodiment, the first frequency sub-band is a carrier.

In one embodiment, the first frequency sub-band is a Bandwidth Part (BWP).

In one embodiment, the first frequency sub-band is composed of a positive integer number of contiguous subcarriers in frequency domain.

In one embodiment, the first frequency sub-band is of a bandwidth of 20 MHz.

In one embodiment, the first frequency sub-band is of a bandwidth of 10 MHz.

In one embodiment, the first frequency sub-band is of a bandwidth of 2.16 GHz.

In one embodiment, the first frequency sub-band is composed of frequency-domain resources occupied by a positive integer number of Physical Resource Block (PRBs) in frequency domain.

In one embodiment, the first frequency sub-band is a channel generated through channelization on Unlicensed Spectrum on the basis of a given channel bandwidth.

In one embodiment, the reference time window is a slot.

In one embodiment, the reference time window is a mini-slot.

In one embodiment, the reference time window comprises a positive integer number of Orthogonal Frequency Division Multiplexing (OFDM) symbols.

In one embodiment, the reference time window comprises a latest downlink transmission for which a HARQ feedback can be acquired prior to the Q1 time sub-pools.

In one embodiment, the reference time window refers to resources occupied by the K1 radio signals in time domain.

In one embodiment, in between an end time for the K1 radio signals and a start time for the Q1 time sub-pools there is no such radio signal that gets a HARQ feedback.

In one embodiment, each radio signal of the K1 radio signals is transmitted through a Downlink Shared Channel (DL-SCH).

In one embodiment, each radio signal of the K1 radio signals is transmitted through a Physical Downlink Shared Channel (PDSCH).

In one embodiment, any two radio signals of the K1 radio signals are transmitted through orthogonal time-frequency resources.

In one embodiment, there are two radio signals of the K1 radio signals that are transmitted through non-orthogonal time-frequency resources.

In one embodiment, only the K1 radio signals are transmitted in the reference time window.

In one embodiment, radio signal(s) other than the K1 radio signals is(are) also transmitted in the reference time window.

In one embodiment, the K1 radio signals are transmitted on Unlicensed Spectrum.

In one embodiment, each of the K1 HARQ feedbacks is transmitted through a Physical Uplink Control Channel (PUSCCH).

In one embodiment, each of the K1 HARQ feedbacks is transmitted through a same channel.

In one embodiment, there are two HARQ feedbacks out of the K1 HARQ feedbacks that are transmitted through different channels.

In one embodiment, each of the K1 HARQ feedbacks is transmitted through a Physical Uplink Shared Channel (PUSCH).

In one embodiment, there is one HARQ feedback of the K1 HARQ feedbacks that is transmitted through a PUSCH, and in the meanwhile there is another HARQ feedback of the K1 HARQ feedbacks that is transmitted through a Physical Uplink Control Channel (PUCCH).

In one embodiment, the K1 HARQ feedbacks are all transmitted in a same slot.

In one embodiment, there are two HARQ feedbacks out of the K1 HARQ feedbacks that are transmitted in different slots.

In one embodiment, any two time sub-pools of the Q1 time sub-pools are of a same time length.

In one embodiment, there are two time sub-pools of the Q1 time sub-pools that are of different time lengths.

In one embodiment, there is a time sub-pool of a length of 16 μs.

In one embodiment, an earliest time sub-pool of the Q1 time sub-pools and any other time sub-pool of the Q1 time sub-pools are of different time lengths.

In one embodiment, any two time sub-pools of the Q1 time sub-pools are orthogonal in time.

In one embodiment, the Q1 time sub-pools occupy contiguous time-domain resources.

In one embodiment, any two time sub-pools of the Q1 time sub-pools occupy non-contiguous time-domain resources.

In one embodiment, any one time sub-pool of the Q1 time sub-pools occupies contiguous time-domain resources.

In one embodiment, each of the Q1 time sub-pools is monitoring time in Cat 4 LBT.

In one embodiment, each of the Q1 time sub-pools comprises a defer slot and a back-off slot in Cat-4 LBT.

In one embodiment, each of the Q1 time sub-pools only comprises a slot in Enhanced Clear Channel Assessment (eCCA).

In one embodiment, each of the Q1 time sub-pools comprises slots in initial CCA and eCCA.

In one embodiment, energy detection is also performed in a slot of initial CCA before the Q1 time sub-pools.

In one embodiment, the K1 HARQ feedbacks are respectively used by the base station for determining whether the K1 radio signals are correctly received.

In one embodiment, the K1 HARQ feedbacks respectively indicate whether the K1 radio signals are correctly received.

In one embodiment, each HARQ feedback of the K1 HARQ feedbacks comprises information of 1 bit.

In one embodiment, each HARQ feedback of the K1 HARQ feedbacks is either an Acknowledgement (ACK) or a Negative Acknowledgement (NACK).

In one embodiment, each HARQ feedback of the K1 HARQ feedbacks comprises information of 1 bit; the information of the 1 bit indicates whether a corresponding radio signal out of the K1 radio signals is correctly received.

In one embodiment, the first HARQ feedback is one HARQ feedback of the K1 HARQ feedbacks used for determining whether the first radio signal is correctly received.

In one embodiment, the first HARQ feedback indicates whether the first radio signal is correctly received.

In one embodiment, HARQ feedbacks of the K1 HARQ feedbacks other than the first HARQ feedback are used by the base station for determining the Q1 time sub-pools.

In one embodiment, the first bit block comprises a bit output by a transport block (TB) through channel coding and rate matching.

In one embodiment, the first bit block comprises a positive integer number of bits.

In one embodiment, the first radio signal is used for transmitting a first transport block (TB); the first bit block is generated by the first TB sequentially through segmentation, channel coding, rate matching, concatenation and scrambling.

In one embodiment, the first radio signal is used for transmitting a first transport block (TB); the first bit block is generated by the first TB sequentially through channel coding, rate matching, and scrambling.

In one embodiment, the first bit block is a TB.

In one embodiment, the first bit block is transferred from a higher layer to a physical layer.

In one embodiment, the first radio signal carries a same code block as a radio signal of the K1 radio signals other than the first radio signal.

In one embodiment, there are two radio signals out of the K1 radio signals that carry a same code block.

In one embodiment, there are not two radio signals out of the K1 radio signals that carry a same TB.

Embodiment 2

Figure 2:
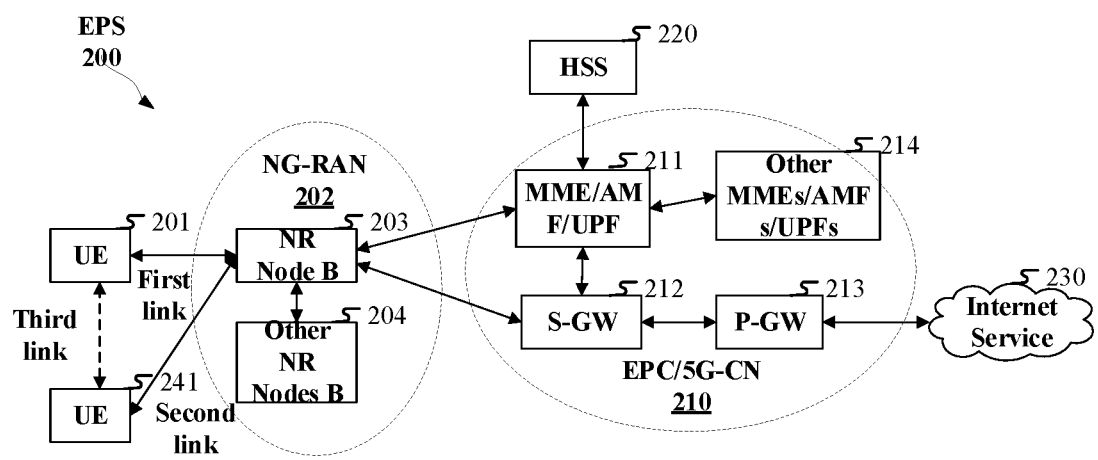
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of NR 5G, Long-Term Evolution (LTE), and Long-Term Evolution Advanced (LTE-A) systems. The NR 5G or LTE network architecture 200 may be called an Evolved Packet System (EPS) 200. The EPS 200 may comprise one or more UEs 201, an NG-RAN 202, an Evolved Packet Core/5G-CoreNetwork (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobile, vehicle or some other appropriate terms. The gNB 203 is connected with the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, and the S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming Services (PSS).

In one embodiment, the gNB 203 corresponds to the base station in the present disclosure.

In one embodiment, the gNB 203 supports transmissions on Unlicensed Spectrum.

In one embodiment, the gNB 203 supports downlink pre-emption.

In one embodiment, the gNB 203 supports CBG-based HARQ feedback reception in downlink.

Embodiment 3

Figure 3:
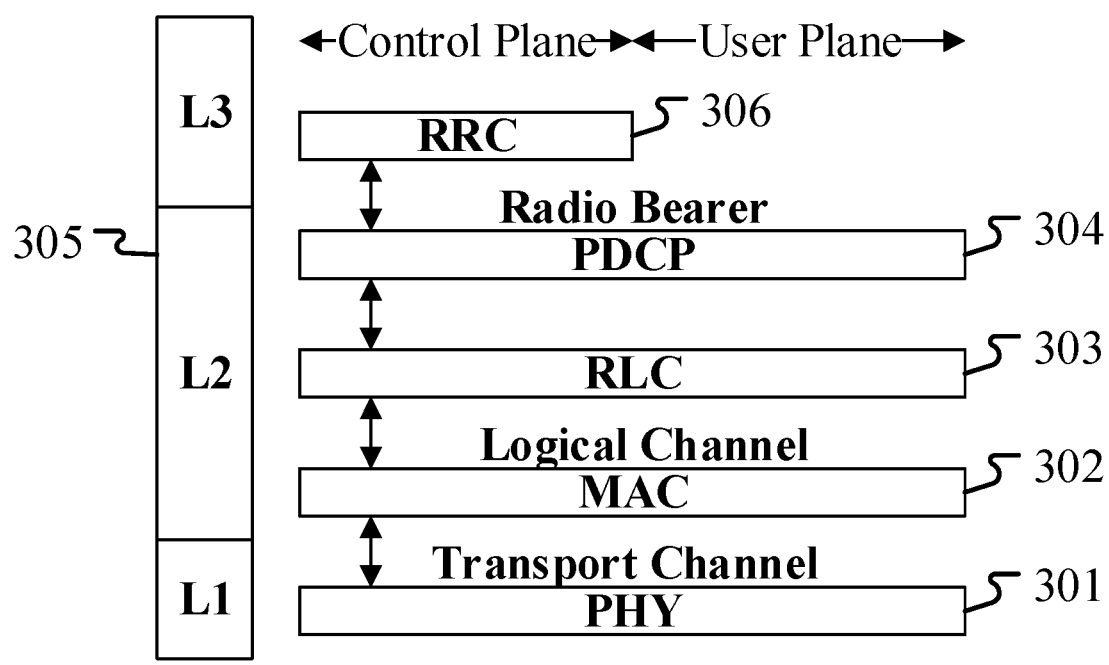
FIG. 3 illustrates a schematic diagram of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3. FIG. 3 is a schematic diagram illustrating a radio protocol architecture of a user plane and a control plane. In FIG. 3, the radio protocol architecture for a UE and a base station (gNB, eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the base station in the present disclosure.

In one embodiment, the K1 radio signals in the present disclosure are generated by the RRC 306.

In one embodiment, the K1 radio signals in the present disclosure are generated by the MAC 302.

In one embodiment, the K1 radio signals in the present disclosure are generated by the PHY 301.

In one embodiment, the K1 HARQ feedbacks in the present disclosure are generated by the PHY 301.

In one embodiment, the second radio signal in the present disclosure is generated by the RRC 306.

In one embodiment, the second radio signal in the present disclosure is generated by the MAC 302.

In one embodiment, the second radio signal in the present disclosure is generated by the PHY 301.

In one embodiment, the third radio signal in the present disclosure is generated by the RRC 306.

In one embodiment, the third radio signal in the present disclosure is generated by the MAC 302.

In one embodiment, the third radio signal in the present disclosure is generated by the PHY 301.

Embodiment 4

Figure 4:
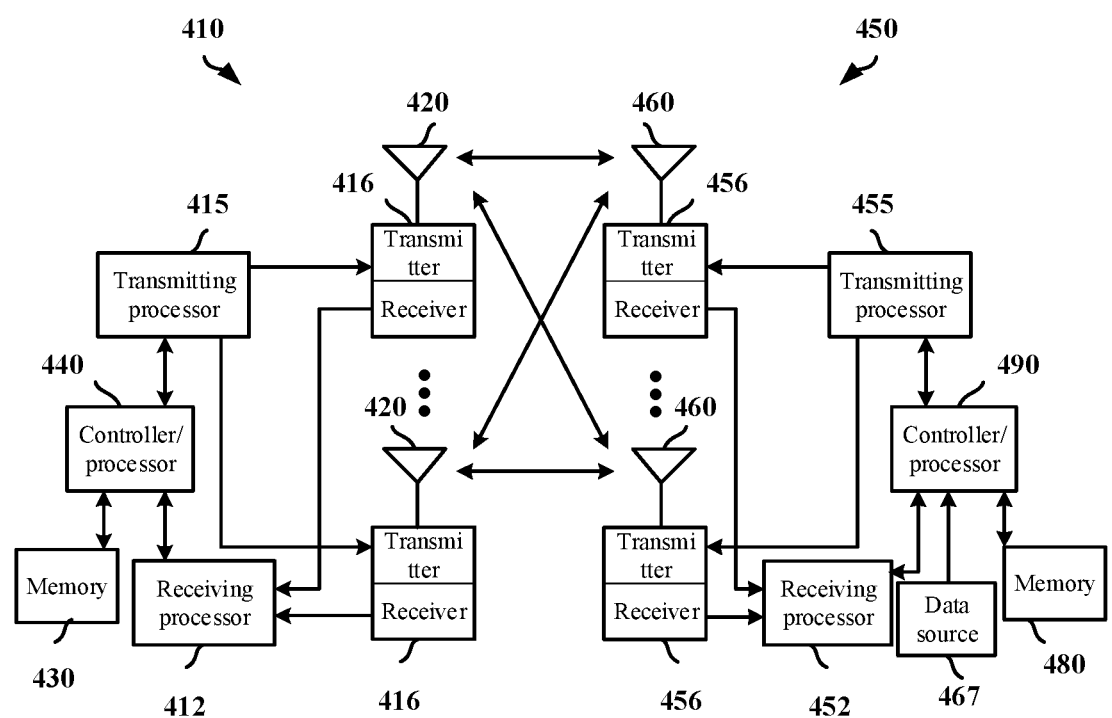
FIG. 4 illustrates a schematic diagram of a base station and a UE according to one embodiment of the present disclosure.

Embodiment 4 illustrates a schematic diagram of a base station and a given UE according to the present disclosure, as shown in FIG. 4. FIG. 4 is a block diagram of a gNB 410 in communication with a UE 450 in an access network.

A base station (410) comprises a controller/processor 440, a memory 430, a receiving processor 412, a transmitter/receiver 416 and a transmitting processor 415, wherein the transmitter/receiver 416 comprises an antenna 420. A higher layer packet is provided to the controller/processor 440, which then provides header compression and decompression, encryption and decryption, packet segmentation and reordering, and multiplexing and demultiplexing between a logical channel and a transport channel so as to implements the L2 protocols used for the user plane and the control plane. The higher layer packet may comprise data or control information, for example, a Downlink Shared Channel (DL-SCH) or an Uplink Shared Channel (UL-SCH). The transmitting processor 415 performs signal transmitting processing functions for the L1 (that is, PHY), including coding, interleaving, scrambling, modulation, power control/allocation, precoding and generation of physical layer control signaling (such as PBCH, PDCCH, PHICH, PCFICH, and reference signal). The receiving processor 412 performs signal receiving processing functions for the L1 (that is, PHY), including decoding, de-interleaving, de-scrambling, demodulation, de-precoding and extraction of physical layer control signaling. The reception of the K1 HARQ feedbacks of the present disclosure is performed by the receiving processor 412. The transmitter 416 is configured to convert a baseband signal provided by the transmitting processor 415 into a radio frequency signal to be transmitted via the antenna 420. The receiver 416 converts the radio frequency signal received via the antenna 420 into a baseband signal and provides the baseband signal to the receiving processor 412.

A UE (450) comprises a controller/processor 490, a memory 480, a receiving processor 452, a transmitter/receiver 456, a transmitting processor 455 and a data source 467, wherein the transmitter/receiver 456 comprises an antenna 460. The data source 467 provides a higher-layer packet to the controller/processor 490. The controller/processor 490 provides header compression and decompression, encryption and decryption, packet segmentation and reordering as well as multiplexing and demultiplexing between a logical channel and a transport channel so as to implement the L2 layer protocols used for a user plane and a control plane. The higher-layer packet may comprise data or control information, for example, a DL-SCH or a UL-SCH. The transmitting processor 455 performs signal transmitting processing functions for the L1 (that is, PHY), including coding, interleaving, scrambling, modulation, power control/allocation, precoding and generation of physical layer control signaling. The transmission of the K1 HARQ feedbacks of the present disclosure is performed by the transmitting processor 455. The receiving processor 452 performs signal receiving processing functions for the L1 (that is, PHY), including decoding, de-interleaving, de-scrambling, demodulation, de-precoding and extraction of physical layer control signaling. The transmitter 456 is configured to convert a baseband signal provided by the transmitting processor 455 into a radio frequency signal to be transmitted via the antenna 460. The receiver 456 converts the radio frequency signal received via the antenna 460 into a baseband signal and provides the baseband signal to the receiving processor 452.

In DL transmission, a higher-layer packet DL-SCH, which comprises the K1 radio signals, the second radio signal and the third radio signal of the present disclosure, is provided to the controller/processor 440. The controller/processor 440 implements the functionality of the L2 layer. In DL, the controller/processor 440 provides header compression, encryption, packet segmentation and reordering, and multiplexing between a logical channel and a transport channel as well as radio resources allocation of the UE 450 based on varied priority levels. The controller/processor 440 is also in charge of HARQ operation, a retransmission of a lost packet and a signaling to the UE 450. Signal processing functions include decoding and interleaving so as to promote Forward Error Correction (FEC) and modulation of baseband signals based on each modulation scheme (e.g., BPSK, QPSK). Modulation symbols are divided into parallel streams of which each is mapped into a corresponding multicarrier subcarrier and/or multicarrier symbol, and then is mapped from the transmitting processor 415 to the antenna 420 via the transmitter 416 to be transmitted in the form of a radio frequency signal. At the receiver side, each receiver 456 receives a radio frequency signal via a corresponding antenna 460, recovers baseband information modulated onto a radio frequency carrier, and provides the baseband information to the receiving processor 452. The receiving processor 452 performs various signal receiving processing functions for the L1 layer. The functions include Q1 energy detections and reception of K1 HARQ feedbacks in the present disclosure. Multicarrier symbols in multicarrier symbol streams are demodulated based on varied modulation schemes (e.g., BPSK, QPSK), and then are decoded and de-interleaved so as to recover data or control signal transmitted by the gNB 410 on a physical channel. The data and control signal are later provided to the controller/processor 490. The controller/processor 490 implements the L2 layer functionality. The controller/processor 490 can be associated with the memory 480 that stores program codes and data. The memory 480 can be called a computer readable medium.

In one embodiment, the gNB 410 comprises at least one processor and at least one memory. The at least one memory comprises computer program codes; the at least one memory and the computer program codes are configured to be used in collaboration with the at least one processor. The gNB 410 at least transmits K1 radio signals in a first reference time window; receives K1 HARQ feedbacks; and performs Q1 energy detections respectively in Q1 time sub-pools on a first frequency sub-band; herein, the K1 HARQ feedbacks are respectively used for determining whether the K1 radio signals are correctly received; a first radio signal is one radio signal of the K1 radio signals, the first radio signal carries part of bits comprised by a first bit block; a first HARQ feedback is used for determining whether the first radio signal is correctly received, HARQ feedback(s) other than the first HARQ feedback among the K1 HARQ feedbacks is(are) used for determining the Q1 time sub-pools, both the K1 and the Q1 are positive integers greater than 1.

In one embodiment, the gNB 410 comprises a memory that stores a computer readable instruction program. The computer readable instruction program generates an action when executed by at least one processor. The action includes: transmitting K1 radio signals in a first reference time window; receiving K1 HARQ feedbacks; and performing Q1 energy detections respectively in Q1 time sub-pools on a first frequency sub-band; herein, the K1 HARQ feedbacks are respectively used for determining whether the K1 radio signals are correctly received; a first radio signal is one radio signal of the K1 radio signals, the first radio signal carries part of bits comprised by a first bit block; a first HARQ feedback is used for determining whether the first radio signal is correctly received, HARQ feedback(s) other than the first HARQ feedback among the K1 HARQ feedbacks is(are) used for determining the Q1 time sub-pools, both the K1 and the Q1 are positive integers greater than 1.

In one embodiment, the gNB 410 corresponds to the base station in the present disclosure.

In one embodiment, the transmitter 416 (comprising the antenna 420), the transmitting processor 415 and the controller/processor 440 are used for transmitting the K1 radio signals in the present disclosure.

In one embodiment, the transmitter 416 (comprising the antenna 420), the transmitting processor 415 and the controller/processor 440 are used for transmitting the second radio signal in the present disclosure.

In one embodiment, the transmitter 416 (comprising the antenna 420), the transmitting processor 415 and the controller/processor 440 are used for transmitting the third radio signal in the present disclosure.

In one embodiment, the receiver 416 (comprising the antenna 420) and the receiving processor 412 are used for receiving the K1 HARQ feedbacks in the present disclosure.

In one embodiment, the receiver 416 (comprising the antenna 420), the receiving processor 412 and the controller/processor 440 are used for performing the Q1 energy detections in the present disclosure.

Embodiment 5

Figure 5:
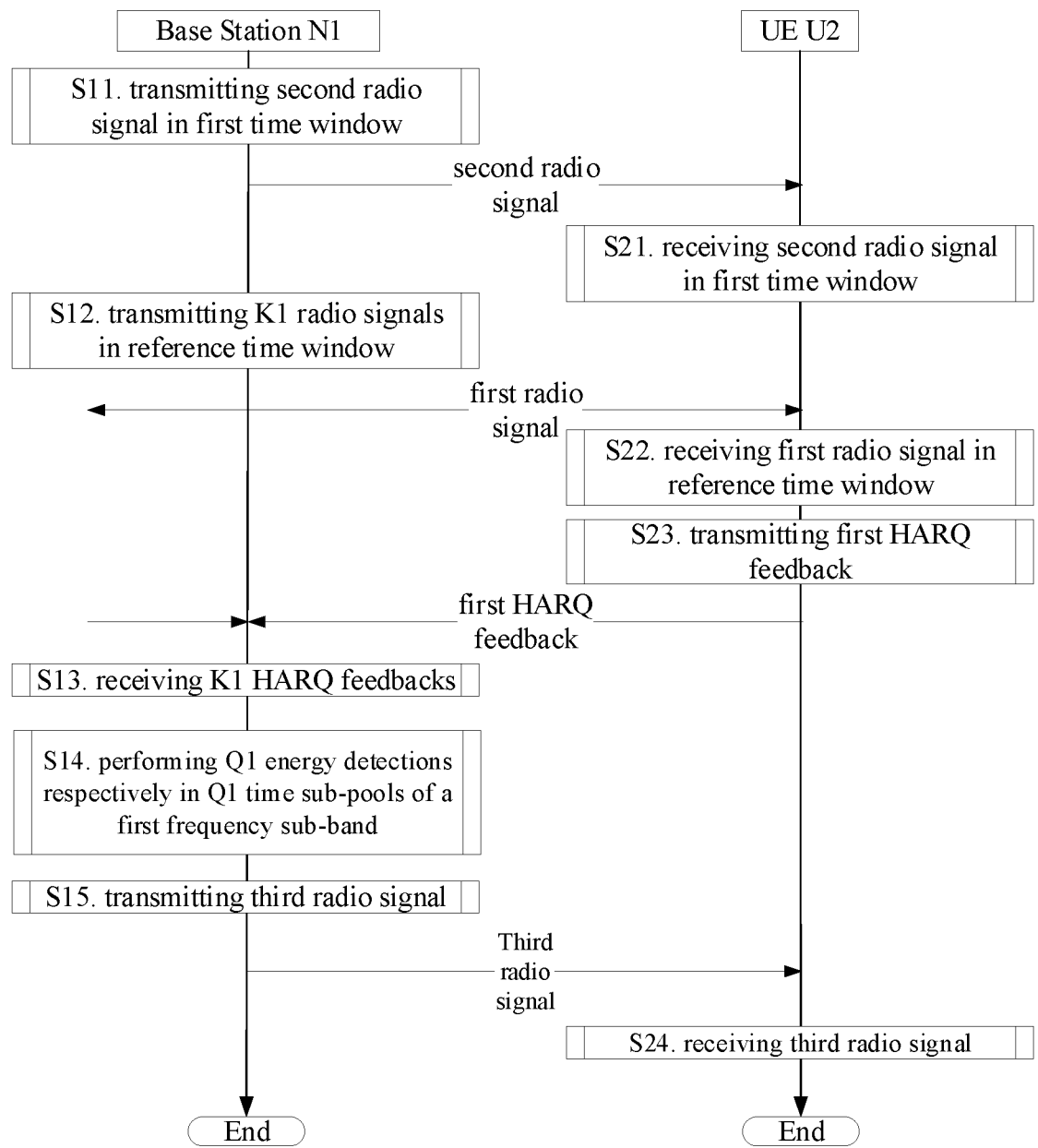
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a base station N1 is a maintenance base station for a serving cell of a UE U2.

The base station N1 transmits a second radio signal in a first time window in step S11, transmits K1 radio signals in a reference time window in step S12, receives K1 HARQ feedbacks in step S13, performs Q1 energy detections respectively in Q1 time sub-pools on a first frequency sub-band in step S14, and transmits a third radio signal in step S15.

The UE U2 receives a second radio signal in step S21, receives a first radio signal in a reference time window in step S22, transmits a first HARQ feedback in step S23 and receives a third radio signal in step S24.

In Embodiment 15, the K1 HARQ feedbacks are respectively used for determining whether the K1 radio signals are correctly received; a first radio signal is one radio signal of the K1 radio signals, the first radio signal carries part of bits comprised by a first bit block; a first HARQ feedback is used for determining whether the first radio signal is correctly received, HARQ feedback(s) other than the first HARQ feedback among the K1 HARQ feedbacks is(are) used for determining the Q1 time sub-pools, both the K1 and the Q1 are positive integers greater than 1; an end of the first time window is earlier than a start of the reference time window, M1 code blocks are used for generating the second radio signal, the M1 is a positive integer greater than 1, each code block of the M1 code blocks comprises a positive integer number of bit(s), the M1 code blocks belong to a same transport block; among the M1 code blocks only M2 code block(s) is(are) used for generating the first radio signal, the M2 is a positive integer less than the M1; a start time for a transmission of the third radio signal is an end time for the Q1 time sub-pools.

In one embodiment, the first bit block is used for generating X1 modulation symbols, the X1 modulation symbols respectively correspond to X1 resource elements, the first radio signal occupies X2 resource elements out of the X1 resource elements, the first radio signal is generated by X2 modulation symbols out of the X1 modulation symbols that correspond to the X2 resource elements, the X2 is a positive integer, and the X1 is a positive integer greater than the X2.

In one embodiment, HARQ feedback(s) other than the first HARQ feedback among the K1 HARQ feedbacks is(are) used for determining K2 candidate integers; Q2 is a candidate integer of the K2 candidate integers, the Q1 time sub-pools comprise Q2 time sub-pools; each energy detection of Q2 energy detections performed by the base station in the Q2 time sub-pools is lower than a first threshold.

In one embodiment, the Q1 time sub-pools comprise a first time sub-pool and Q3 time sub-pool(s), the first time sub-pool is an earliest time sub-pool of the Q1 time sub-pools, the Q3 time sub-pool(s) is(are) contiguous time sub-pool(s) out of the Q1 time sub-pools that is(are) adjacent to the first time sub-pool, the first time sub-pool and each time sub-pool of the Q3 time sub-pool(s) are time sub-pools outside the Q2 time sub-pools, of all energy detections performed by the base station in the first time sub-pool and the Q3 time sub-pool(s) there is one energy detection that is not lower than the first threshold, the Q3 is a positive integer.

In one embodiment, the K2 is a positive integer comprised by a first integer set, the first integer set comprises a positive integer number of positive integer(s), a priority level corresponding to the third radio signal is used for determining the first integer set and the Q3.

In one embodiment, HARQ feedback(s) other than the first HARQ feedback among the K1 HARQ feedbacks comprises (comprise) K3 negative feedback(s), the K3 is a positive integer less than the K1; when a ratio of the K3 to the K1 is no less than a target ratio, the K2 is equal to a minimum integer comprised by the first integer set that is greater than K0, the K0 is an integer comprised by the first integer set, and the K0 is used for determining a start of the reference time window, the target ratio is pre-defined.

In one embodiment, the third radio signal is a first transmission on the first frequency sub-band after an end of the reference time window.

In one embodiment, in between an end of the reference time window and a start time for the third radio signal there is no such radio signal that is transmitted by the base station on the first frequency sub-band.

In one embodiment, the third radio signal comprises Physical Downlink Control Channel (PDCCH).

In one embodiment, the third radio signal is transmitted through a DL-SCH.

In one embodiment, the third radio signal is transmitted through a PDSCH.

In one embodiment, the third radio signal occupies Unlicensed Spectrum.

In one embodiment, the third radio signal carries Downlink Control Information (DCI).

In one embodiment, the third radio signal is transmitted through a Physical Broadcast Channel (PBCH).

Embodiment 6

Figure 6:
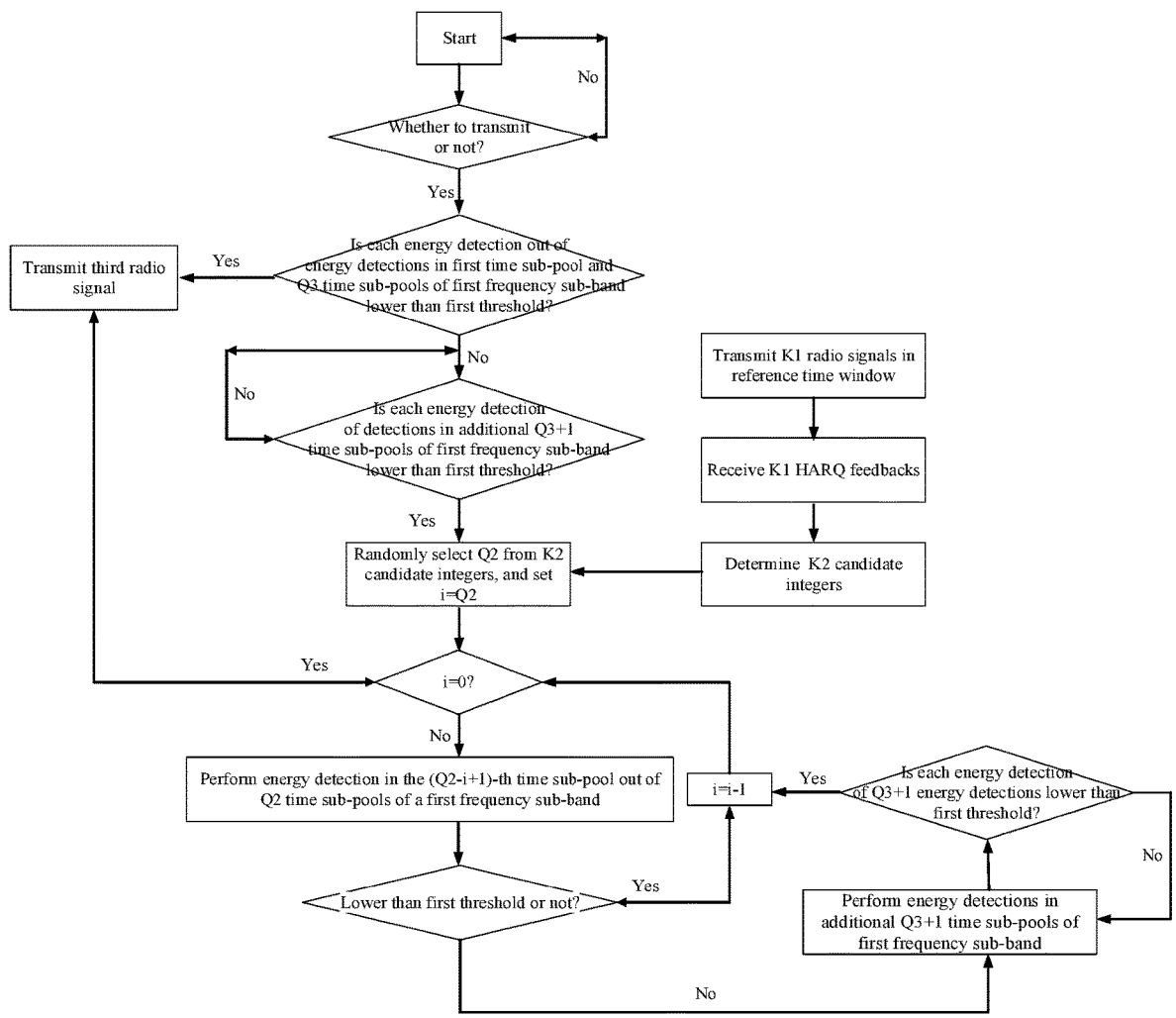
FIG. 6 illustrates a schematic diagram of a process of performing Q1 energy detections respectively in Q1 time sub-pools according to one embodiment of the present disclosure.

Embodiment 6 illustrates a schematic diagram of a process of performing Q1 energy detections respectively in Q1 time sub-pools according to one embodiment of the present disclosure, as shown in FIG. 6. In FIG. 6, each square represents a step, while each diamond represents a determination.

In one embodiment, the K1 HARQ feedbacks of the present disclosure are respectively used for determining whether the K1 radio signals of the present disclosure are correctly received; a first radio signal is one radio signal of the K1 radio signals, the first radio signal carries part of bits comprised by a first bit block; a first HARQ feedback is used for determining whether the first radio signal is correctly received; HARQ feedback(s) other than the first HARQ feedback among the K1 HARQ feedbacks is(are) used for determining K2 candidate integers; Q2 is a candidate integer of the K2 candidate integers, the Q1 time sub-pools comprise Q2 time sub-pools; each energy detection of Q2 energy detections performed by the base station in the Q2 time sub-pools is lower than a first threshold; both the K1 and the Q1 are positive integers greater than 1; the Q1 time sub-pools comprise a first time sub-pool and Q3 time sub-pool(s), the first time sub-pool is an earliest time sub-pool of the Q1 time sub-pools, the Q3 time sub-pool(s) is(are) contiguous time sub-pool(s) out of the Q1 time sub-pools that is(are) adjacent to the first time sub-pool, the first time sub-pool and each time sub-pool of the Q3 time sub-pool(s) are time sub-pools outside the Q2 time sub-pools, of all energy detections performed by the base station in the first time sub-pool and the Q3 time sub-pool(s) there is one energy detection that is not lower than the first threshold, the Q3 is a positive integer.

In one embodiment, the Q2 time sub-pools comprise a last time sub-pool out of the Q1 time sub-pools.

In one embodiment, the Q2 time sub-pools do not comprise slots of a defer duration.

In one embodiment, the Q2 time sub-pools comprise slots of a defer duration.

In one embodiment, the base station randomly selects the Q2 from the K2 candidate integers.

In one embodiment, any energy detection of the Q2 energy detections belongs to the Q1 energy detections.

In one embodiment, any candidate integer of the K2 candidate integers is a non-negative integer.

In one embodiment, the K2 candidate integers comprise 0.

In one embodiment, any two candidate integers of the K2 candidate integers are unequal.

In one embodiment, the K2 is a positive integer greater than 1.

In one embodiment, there are two candidate integers out of the K2 candidate integers that are equal.

In one embodiment, the K2 candidate integers are K2 sequentially arranged integers from 0 to K2-1.

In one embodiment, the K2 candidate integers are 0, 1, 2 . . . , and K2-1.

In one embodiment, any two time sub-pools of the Q2 time sub-pools are of equal time length.

In one embodiment, any time sub-pool of the Q2 time sub-pools is of a time length of 9 μs.

In one embodiment, ant two time sub-pools of the Q2 time sub-pools are orthogonal in time.

In one embodiment, the Q2 time sub-pools occupy contiguous time domain resources.

In one embodiment, there are two time sub-pools out of the Q2 time sub-pools that occupy non-contiguous time domain resources.

In one embodiment, the Q2 time sub-pools refer to backoff time in Cat 4 LBT.

In one embodiment, the Q2 time sub-pools are respectively CCA slots comprised in backoff time in Cat 4 LBT.

In one embodiment, the Q2 time sub-pools comprise CCA slots of a last defer duration.

In one embodiment, before the Q1 energy detections there are also Q3+1 energy detections performed in Q3+1 time sub-pools besides the Q1 time sub-pools.

In one embodiment, before the Q1 energy detections there are also Q3+1 energy detections performed in initial CCA slots besides the Q1 time sub-pools.

In one embodiment, before the Q1 energy detections there are also Q3+1 energy detections performed in Q3+1 time sub-pools besides the Q1 time sub-pools; among the Q3+1 energy detections there is one energy detection not lower than the first threshold.

In one embodiment, before the Q1 energy detections there are also Q3+1 energy detections performed in initial CCA slots besides the Q1 time sub-pools; among the initial CCA slots there is one initial CCA slot in which the energy detection is not lower than the first threshold.

In one embodiment, the first threshold is measured by J.

In one embodiment, the first threshold is measured by mW.

In one embodiment, the first threshold is measured by dBm.

In one embodiment, the first threshold is equal to or less than −72 dBm.

In one embodiment, the first threshold is an arbitrary value equal to or less than a given value, the given value is pre-defined.

In one embodiment, the first threshold is selected by the base station at liberty on the condition that the first threshold is equal to or less than a given value.

In one embodiment, the first time sub-pool and any time sub-pool of the Q3 time sub-pool(s) are of unequal lengths.

In one embodiment, the first time sub-pool occupies contiguous time domain resources.

In one embodiment, any two time sub-pools of the Q3 time sub-pools are of equal length, the Q3 is greater than 1.

In one embodiment, the Q3 is equal to 1.

In one embodiment, the Q3 is equal to $T_{sl}$ in 3GPP TS36.213, section 15.

In one embodiment, the first time sub-pool is of a time length of 16 μs.

In one embodiment, any one time sub-pool of the Q3 time sub-pool(s) is of a time length of 9 μs.

In one embodiment, any two time sub-pools of the Q3 time sub-pools are orthogonal in time.

In one embodiment, the Q3 time sub-pool(s) occupies (occupy) contiguous time domain resources.

In one embodiment, any time sub-pool of the Q3 time sub-pool(s) occupies contiguous time domain resources.

Embodiment 7

Figure 7:
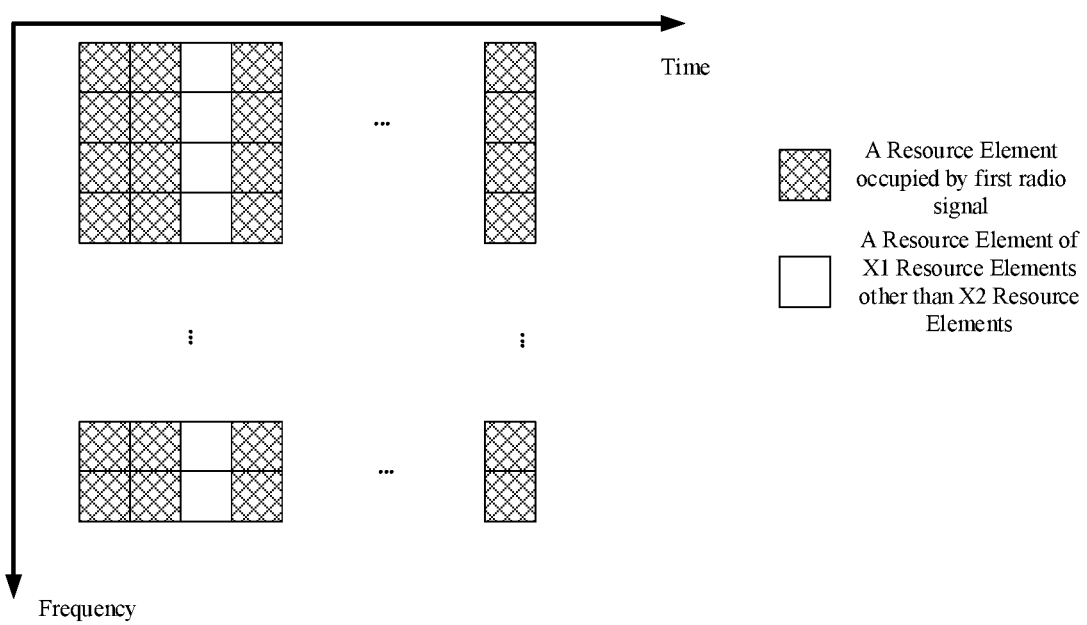
FIG. 7 illustrates a schematic diagram of relations between X1 resource elements and X2 resource elements according to one embodiment of the present disclosure.

Embodiment 7 illustrates a schematic diagram of relations between X1 resource elements and X2 resource elements according to one embodiment of the present disclosure, as shown in FIG. 7. In FIG. 7, the horizontal axis represents time, and the vertical axis represents frequency; each small box represents a resource element. Each box filled with crosses represents a resource element of X2 resource elements; each blank box represents a resource element of X1 resource elements other than X2 resource elements.

In Embodiment 7, the first bit block in the present disclosure is used for generating X1 modulation symbols, the X1 modulation symbols respectively correspond to X1 resource elements, the first radio signal occupies X2 resource elements out of the X1 resource elements, the first radio signal is generated by X2 modulation symbols out of the X1 modulation symbols that correspond to the X2 resource elements, the X2 is a positive integer, and the X1 is a positive integer greater than the X2.

In one embodiment, among the K1 radio signals, there is also a fourth radio signal that occupies X3 resource element(s) out of the X1 resource elements (REs), and there is not any resource element belonging to the X2 resource elements and the X3 resource element(s) simultaneously.

In one embodiment, the first radio signal is punctured by one or more radio signals out of the K1 radio signals other than the first radio signal.

In one embodiment, the first radio signal is pre-empted by one or more radio signals out of the K1 radio signals other than the first radio signal.

In one embodiment, the X1 modulation symbols all employ a same modulation scheme.

In one embodiment, the first radio signal is used for transmitting a complete TB.

In one embodiment, the first radio signal is used for transmitting all CBs of a TB.

In one embodiment, each resource element of the X1 resource elements occupies a subcarrier in frequency domain, and occupies a multicarrier symbol in time domain, wherein one multicarrier symbol comprises a Cyclic Prefix (CP).

In one embodiment, each resource element of the X1 resource elements occupies an OFDM subcarrier in frequency domain, and occupies an OFDM symbol in time domain, wherein one OFDM symbol comprises a CP.

In one embodiment, the X1 modulation symbols are generated by bits of the first bit block sequentially through modulation.

In one embodiment, the X1 modulation symbols are generated by bits of the first bit block sequentially through scrambling and modulation.

In one embodiment, the X1 modulation symbols are generated by the first bit block sequentially through segmentation, channel coding, rate matching, concatenation, scrambling and modulation.

In one embodiment, the X1 modulation symbols are generated by the first bit block sequentially through channel coding, rate matching, scrambling and modulation.

Embodiment 8

Figure 8:
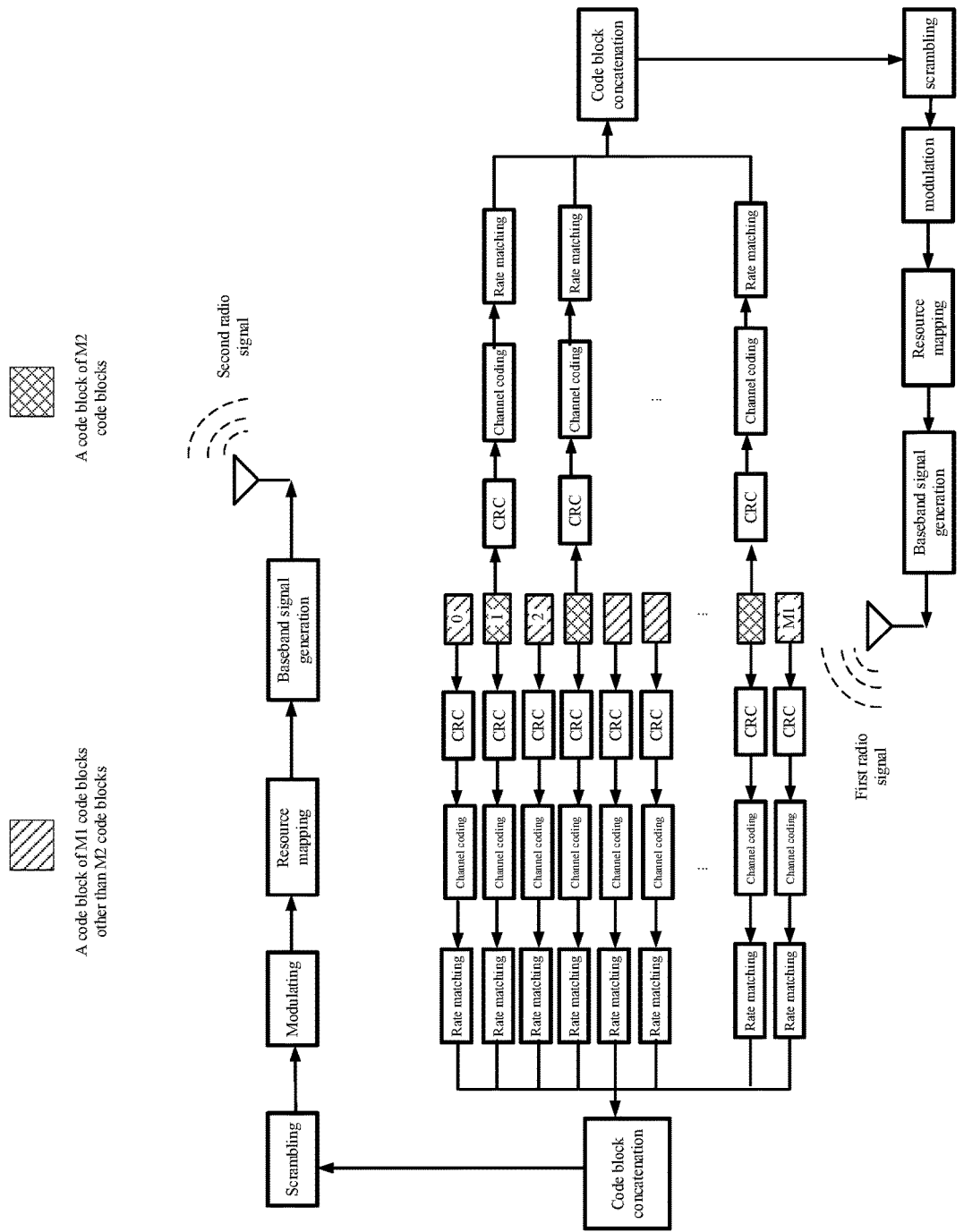
FIG. 8 illustrates a schematic diagram of a relation between a first radio signal and a second radio signal according to one embodiment of the present disclosure.

Embodiment 8 illustrates a schematic diagram of a relation between a first radio signal and a second radio signal according to one embodiment of the present disclosure, as shown in FIG. 8. In FIG. 8, each box filled with slashes represents one code block of M1 code blocks other than M2 code block(s); each box filed with crosses represents a code block of M2 code block(s); each blank box represents a baseband processing function performed when a code block is used for generating a first radio signal or a second radio signal.

In Embodiment 8, an end of the first time window in the present disclosure is earlier than a start of the reference time window in the present disclosure, M1 code blocks are used for generating the second radio signal, the M1 is a positive integer greater than 1, each code block of the M1 code blocks comprises a positive integer number of bit(s), the M1 code blocks belong to a same transport block; among the M1 code blocks only M2 code block(s) is(are) used for generating the first radio signal, the M2 is a positive integer less than the M1.

In one embodiment, the M1 code blocks are obtained through segmentation of a same TB.

In one embodiment, the M1 code blocks are obtained through a same TB through a segmentation method of 3GPP TS38.212, section 5.2.2.

In one embodiment, each of the M1 code blocks is a Low density parity check coding (LDPC) code block.

In one embodiment, the M1 code blocks comprise a positive integer number of Code Block Group(s) (CBG).

In one embodiment, the M2 code block(s) comprises (comprise) a positive integer number of CBG(s).

In one embodiment, the first radio signal is a CBG-based HARQ retransmission of the second radio signal.

In one embodiment, any two code blocks of the M1 code blocks comprise equal numbers of bits.

In one embodiment, there are two code blocks out of M1 code blocks that comprise equal numbers of bits.

In one embodiment, the second output bit block is generated by the M1 code blocks sequentially through Cyclic Redundancy Check (CRC) insertion, channel coding, rate matching, and concatenation; the second radio signal is obtained after the second output bit block goes through scrambling, a modulation mapper, a layer mapper, precoding, a resource element mapper and OFDM signal generation in sequence.

In one embodiment, the first output bit block is generated by the M2 code block(s) sequentially through Cyclic Redundancy Check (CRC) insertion, channel coding, rate matching, and concatenation; the first radio signal is obtained after the first output bit block goes through scrambling, a modulation mapper, a layer mapper, precoding, a resource element mapper and OFDM signal generation in sequence.

In one embodiment, the second radio signal is transmitted through a PDSCH.

In one embodiment, the second radio signal is transmitted through a DL-SCH.

In one embodiment, the first radio signal and the second radio signal belong to a same HARQ process.

In one embodiment, the second radio signal is a first transmission of a HARQ process.

In one embodiment, the second radio signal is a retransmission of a HARQ process.

In one embodiment, the first radio signal is a retransmission of a HARQ process.

In one embodiment, the first time window is of the same time length as the reference time window.

In one embodiment, the time length of the first time window is difference from the time length of the reference time window.

In one embodiment, the first time window is a slot.

In one embodiment, the first time window is a mini-slot.

In one embodiment, the first time window comprises a positive integer number of OFDM symbol(s).

Embodiment 9

Embodiment 9 illustrates a schematic diagram of a first integer set and Q3 according to one embodiment of the present disclosure, as shown in FIG. 9. In FIG. 9, the first row represents a priority level of a radio signal; the second row represents a number of time sub-pools other than an earliest time sub-pool comprised by an initial defer duration corresponding to each priority level; the third row represents a candidate integer set corresponding to each priority level. The priority level in bold is a priority level of a third radio signal, the number of time sub-pools in bold is Q3, and the candidate integer set in bold is a first integer set.

In Embodiment 9, the K2 in the present disclosure is a positive integer out of a first integer set; the first integer set comprises a positive integer number of positive integer(s); a priority level of the third radio signal in the present disclosure is used for determining the first integer set and the Q3 in the present disclosure.

In one embodiment, any two positive integers of the first integer set are unequal.

In one embodiment, the first integer set comprises 2 positive integers.

In one embodiment, the first integer set comprises 3 positive integers.

In one embodiment, the first integer set comprises 7 positive integers.

In one embodiment, a priority level of the third radio signal is used by the base station for determining the first integer set and the Q3.

In one embodiment, a priority level of the third radio signal is used by the base station for determining the first integer set out of a positive integer number of candidate integer sets; the positive integer number of candidate integer sets are pre-defined.

In one embodiment, a priority level of the third radio signal is related to a traffic type of traffic carried by the third radio signal.

In one embodiment, a priority level of the third radio signal is defined as in 3GPP TS36.213, table 15.1.1-1.

Embodiment 10

Figure 10:
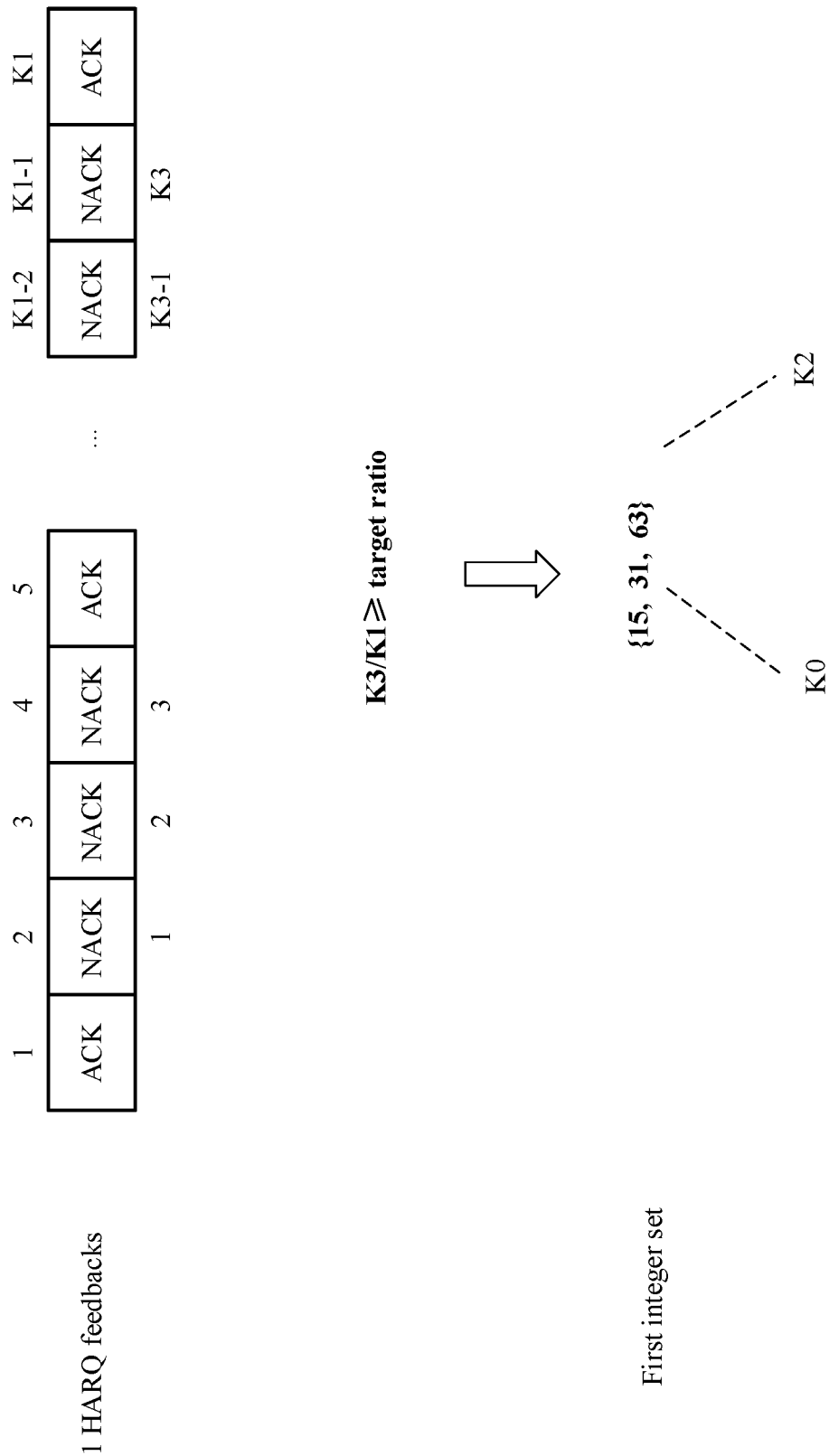
FIG. 10 illustrates a schematic diagram of relations between K0, K1, K2 and K3 according to one embodiment of the present disclosure.

Embodiment 10 illustrates a schematic diagram of relations between K0, K1, K2 and K3 according to one embodiment of the present disclosure, as shown in FIG. 10. In FIG. 10, each box represents a HARQ feedback of K1 HARQ feedbacks; integers encompassed by brackets constitute a first integer set.

In Embodiment 10, HARQ feedback(s) other than the first HARQ feedback among the K1 HARQ feedbacks of the present disclosure comprises (comprise) K3 negative feedback(s), the K3 is a positive integer less than the K1; when a ratio of the K3 to the K1 is no less than a target ratio, the K2 is equal to a minimum integer comprised by the first integer set that is greater than K0, the K0 is an integer comprised by the first integer set, and the K0 is used for determining a start of the reference time window, the target ratio is pre-defined.

In one embodiment, the target ratio is equal to 80%.

In one embodiment, the target ratio is greater than 0 and less than 1.

In one embodiment, the K0 is used by the base station for determining a start of the reference time window.

In one embodiment, the K0 is a number of CCA slots in backoff time of Cat 4 LBT process before the K1 radio signals are transmitted.

In one embodiment, when the K0 is a maximum integer of the first integer set, the K2 is equal to the K0.

In one embodiment, each negative feedback of the K3 negative feedback(s) is a negative acknowledgement (NACK).

Embodiment 11

Figure 11:
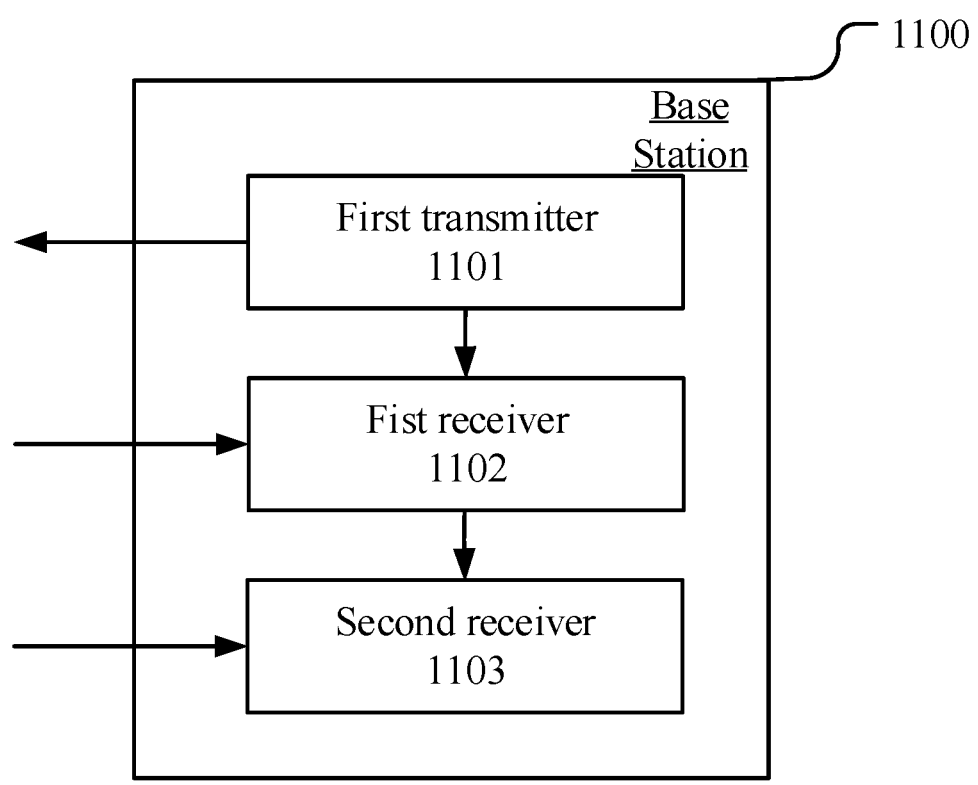
FIG. 11 illustrates a structure block diagram of a processing device in a base station according to one embodiment of the present disclosure.

Embodiment 11 illustrates a structure block diagram of a processing device in a base station, as shown in FIG. 11. In FIG. 11, a base processing device 1100 is composed by a first transmitter 1101, a first receiver 1102 and a second receiver 1103. The first transmitter 1101 comprises the transmitter/receiver 416 (comprising the antenna 420), the transmitting processor 415 and the controller 440 in FIG. 4 of the present disclosure; the first receiver 1102 comprises the transmitter/receiver 416 (comprising the antenna 420) and the receiving processor 412 in FIG. 4 of the present disclosure; the second receiver 1103 comprises the transmitter/receiver 416 (comprising the antenna 420) and the receiving processor 412 in FIG. 4 of the present disclosure.

In Embodiment 11, the first transmitter 1101 transmits K1 radio signals in a reference time window; the first receiver 1102 receives K1 HARQ feedbacks; and the second receiver 1103 performs Q1 energy detections respectively in Q1 time sub-pools on a first frequency sub-band; herein, the K1 HARQ feedbacks are respectively used for determining whether the K1 radio signals are correctly received; a first radio signal is one radio signal of the K1 radio signals, the first radio signal carries part of bits comprised by a first bit block; a first HARQ feedback is used for determining whether the first radio signal is correctly received, HARQ feedback(s) other than the first HARQ feedback among the K1 HARQ feedbacks is(are) used for determining the Q1 time sub-pools, both the K1 and the Q1 are positive integers greater than 1.

In one embodiment, the first bit block is used for generating X1 modulation symbols, the X1 modulation symbols respectively correspond to X1 resource elements, the first radio signal occupies X2 resource elements out of the X1 resource elements, the first radio signal is generated by X2 modulation symbols out of the X1 modulation symbols that correspond to the X2 resource elements, the X2 is a positive integer, and the X1 is a positive integer greater than the X2.

In one embodiment, the first transmitter 1101 also transmits a second radio signal in a first time window; herein, an end of the first time window is earlier than a start of the reference time window, M1 code blocks are used for generating the second radio signal, the M1 is a positive integer greater than 1, each code block of the M1 code blocks comprises a positive integer number of bit(s), the M1 code blocks belong to a same transport block; among the M1 code blocks only M2 code block(s) is(are) used for generating the first radio signal, the M2 is a positive integer less than the M1.

In one embodiment, HARQ feedback(s) other than the first HARQ feedback among the K1 HARQ feedbacks is(are) used for determining K2 candidate integers; Q2 is a candidate integer of the K2 candidate integers, the Q1 time sub-pools comprise Q2 time sub-pools; each energy detection of Q2 energy detections performed by the base station in the Q2 time sub-pools is lower than a first threshold.

In one embodiment, HARQ feedback(s) other than the first HARQ feedback among the K1 HARQ feedbacks is(are) used for determining K2 candidate integers; Q2 is a candidate integer of the K2 candidate integers, the Q1 time sub-pools comprise Q2 time sub-pools; each energy detection of Q2 energy detections performed by the base station in the Q2 time sub-pools is lower than a first threshold; the Q1 time sub-pools comprise a first time sub-pool and Q3 time sub-pool(s), the first time sub-pool is an earliest time sub-pool of the Q1 time sub-pools, the Q3 time sub-pool(s) is(are) contiguous time sub-pool(s) out of the Q1 time sub-pools that is(are) adjacent to the first time sub-pool, the first time sub-pool and each time sub-pool of the Q3 time sub-pool(s) are time sub-pools outside the Q2 time sub-pools, of all energy detections performed by the base station in the first time sub-pool and the Q3 time sub-pool(s) there is one energy detection that is not lower than the first threshold, the Q3 is a positive integer.

In one embodiment, the first transmitter 1101 also transmits a third radio signal; herein, a start time for a transmission of the third radio signal is an end time for the Q1 time sub-pools.

In one embodiment, the first transmitter 1101 also transmits a third radio signal; herein, a start time for a transmission of the third radio signal is an end time for the Q1 time sub-pools; the K2 is a positive integer comprised by a first integer set, the first integer set comprises a positive integer number of positive integer(s), a priority level corresponding to the third radio signal is used for determining the first integer set and the Q3.

In one embodiment, the first transmitter 1101 also transmits a third radio signal; herein, a start time for a transmission of the third radio signal is an end time for the Q1 time sub-pools; the K2 is a positive integer comprised by a first integer set, the first integer set comprises a positive integer number of positive integer(s), a priority level corresponding to the third radio signal is used for determining the first integer set and the Q3; HARQ feedback(s) other than the first HARQ feedback among the K1 HARQ feedbacks comprises (comprise) K3 negative feedback(s), the K3 is a positive integer less than the K1; when a ratio of the K3 to the K1 is no less than a target ratio, the K2 is equal to a minimum integer comprised by the first integer set that is greater than K0, the K0 is an integer comprised by the first integer set, and the K0 is used for determining a start of the reference time window, the target ratio is pre-defined.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, etc. The base station or network side equipment in the present disclosure includes but is not limited to macro-cellular base stations, micro-cellular base stations, home base stations, relay base station, eNB, gNB, Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a base station for wireless communications, comprising:
   transmitting K1 radio signals in a first reference time window;
   receiving K1 HARQ feedbacks; and
   performing Q1 energy detections respectively in Q1 time sub-pools on a first frequency sub-band, the energy detections are energy detections for LBT;
   wherein the K1 HARQ feedbacks are respectively used for determining whether the K1 radio signals are correctly received; a first radio signal is one radio signal of the K1 radio signals, the first radio signal carries part of bits comprised by a first bit block; a first HARQ feedback is used for determining whether the first radio signal is correctly received, HARQ feedback(s) other than the first HARQ feedback among the K1 HARQ feedbacks is(are) used for determining the Q1 time sub-pools, both the K1 and the Q1 are positive integers greater than 1.

2. The method according to claim 1, wherein the first bit block is used for generating X1 modulation symbols, the X1 modulation symbols respectively correspond to X1 resource elements, the first radio signal occupies X2 resource elements out of the X1 resource elements, the first radio signal is generated by X2 modulation symbols out of the X1 modulation symbols that correspond to the X2 resource elements, the X2 is a positive integer, and the X1 is a positive integer greater than the X2.

3. The method according to claim 1, comprising:
   transmitting a second radio signal in a first time window;
   wherein an end of the first time window is earlier than a start of the reference time window, M1 code blocks are used for generating the second radio signal, the M1 is a positive integer greater than 1, each code block of the M1 code blocks comprises a positive integer number of bit(s), the M1 code blocks belong to a same transport block; among the M1 code blocks only M2 code block(s) is(are) used for generating the first radio signal, the M2 is a positive integer less than the M1.

4. The method according to claim 1, wherein HARQ feedback(s) other than the first HARQ feedback among the K1 HARQ feedbacks is(are) used for determining K2 candidate integers; Q2 is a candidate integer of the K2 candidate integers, the Q1 time sub-pools comprise Q2 time sub-pools; each energy detection of Q2 energy detections performed by the base station in the Q2 time sub-pools is lower than a first threshold.

5. The method according to claim 4, wherein the K2 candidate integers are 0, 1, 2 . . . , and K2-1; the base station randomly selects the Q2 from the K2 candidate integers; any two time sub-pools of the Q2 time sub-pools are of equal length, any two time sub-pools of the Q2 time sub-pools are orthogonal in time, the Q2 time sub-pools occupy contiguous time-domain resources.

6. The method according to claim 4, wherein the Q1 time sub-pools comprise a first time sub-pool and Q3 time sub-pool(s), the first time sub-pool is an earliest time sub-pool of the Q1 time sub-pools, the Q3 time sub-pool(s) is(are) contiguous time sub-pool(s) out of the Q1 time sub-pools that is(are) adjacent to the first time sub-pool, the first time sub-pool and each time sub-pool of the Q3 time sub-pool(s) are time sub-pools outside the Q2 time sub-pools, of all energy detections performed by the base station in the first time sub-pool and the Q3 time sub-pool(s) there is one energy detection that is not lower than the first threshold, the Q3 is a positive integer.

7. The method according to claim 6, comprising:
   transmitting a third radio signal;
   wherein a start time for a transmission of the third radio signal is an end time for the Q1 time sub-pools; the K2 is a positive integer comprised by a first integer set, the first integer set comprises a positive integer number of positive integer(s), a priority level corresponding to the third radio signal is used for determining the first integer set and the Q3.

8. The method according to claim 7, HARQ feedback(s) other than the first HARQ feedback among the K1 HARQ feedbacks comprises (comprise) K3 negative feedback(s), the K3 is a positive integer less than the K1; when a ratio of the K3 to the K1 is no less than a target ratio, the K2 is equal to a minimum integer comprised by the first integer set that is greater than K0, the K0 is an integer comprised by the first integer set, and the K0 is used for determining a start of the reference time window, the target ratio is pre-defined.

9. The method according to claim 1, wherein the reference time window comprises a latest downlink transmission for which a HARQ feedback can be acquired prior to the Q1 time sub-pools, or the reference time window refers to resources occupied by the K1 radio signals in time domain.

10. The method according to claim 1, wherein the first radio signal is used for transmitting a first transport block, the first bit block is generated by the first transport block sequentially through segmentation, channel coding, rate matching, concatenation and scrambling.

11. A base station for wireless communications, comprising:
 a first transmitter, transmitting K1 radio signals in a reference time window;
 a first receiver, receiving K1 HARQ feedbacks; and
 a second receiver, performing Q1 energy detections respectively in Q1 time sub-pools on a first frequency sub-band, the energy detections are energy detections for LBT;
 wherein the K1 HARQ feedbacks are respectively used for determining whether the K1 radio signals are correctly received; a first radio signal is one radio signal of the K1 radio signals, the first radio signal carries part of bits comprised by a first bit block; a first HARQ feedback is used for determining whether the first radio signal is correctly received, HARQ feedback(s) other than the first HARQ feedback among the K1 HARQ feedbacks is(are) used for determining the Q1 time sub-pools, both the K1 and the Q1 are positive integers greater than 1.

12. The base station according to claim 11, wherein the first bit block is used for generating X1 modulation symbols, the X1 modulation symbols respectively correspond to X1 resource elements, the first radio signal occupies X2 resource elements out of the X1 resource elements, the first radio signal is generated by X2 modulation symbols out of the X1 modulation symbols that correspond to the X2 resource elements, the X2 is a positive integer, and the X1 is a positive integer greater than the X2.

13. The base station according to claim 11, wherein the first transmitter transmits a second radio signal in a first time window; wherein an end of the first time window is earlier than a start of the reference time window, M1 code blocks are used for generating the second radio signal, the M1 is a positive integer greater than 1, each code block of the M1 code blocks comprises a positive integer number of bit(s), the M1 code blocks belong to a same transport block; among the M1 code blocks only M2 code block(s) is(are) used for generating the first radio signal, the M2 is a positive integer less than the M1.

14. The base station according to claim 11, wherein HARQ feedback(s) other than the first HARQ feedback among the K1 HARQ feedbacks is(are) used for determining K2 candidate integers; Q2 is a candidate integer of the K2 candidate integers, the Q1 time sub-pools comprise Q2 time sub-pools; each energy detection of Q2 energy detections performed by the base station in the Q2 time sub-pools is lower than a first threshold.

15. The base station according to claim 14, wherein the K2 candidate integers are 0, 1, 2 . . . , and K2-1; the base station randomly selects the Q2 from the K2 candidate integers; any two time sub-pools of the Q2 time sub-pools are of equal length, any two time sub-pools of the Q2 time sub-pools are orthogonal in time, the Q2 time sub-pools occupy contiguous time-domain resources.

16. The base station according to claim 14, wherein the Q1 time sub-pools comprise a first time sub-pool and Q3 time sub-pool(s), the first time sub-pool is an earliest time sub-pool of the Q1 time sub-pools, the Q3 time sub-pool(s) is(are) contiguous time sub-pool(s) out of the Q1 time sub-pools that is(are) adjacent to the first time sub-pool, the first time sub-pool and each time sub-pool of the Q3 time sub-pool(s) are time sub-pools outside the Q2 time sub-pools, of all energy detections performed by the base station in the first time sub-pool and the Q3 time sub-pool(s) there is one energy detection that is not lower than the first threshold, the Q3 is a positive integer.

17. The base station according to claim 16, wherein the first transmitter transmits a third radio signal; wherein a start time for a transmission of the third radio signal is an end time for the Q1 time sub-pools; the K2 is a positive integer comprised by a first integer set, the first integer set comprises a positive integer number of positive integer(s), a priority level corresponding to the third radio signal is used for determining the first integer set and the Q3.

18. The base station according to claim 17, wherein HARQ feedback(s) other than the first HARQ feedback among the K1 HARQ feedbacks comprises (comprise) K3 negative feedback(s), the K3 is a positive integer less than the K1; when a ratio of the K3 to the K1 is no less than a target ratio, the K2 is equal to a minimum integer comprised by the first integer set that is greater than K0, the K0 is an integer comprised by the first integer set, and the K0 is used for determining a start of the reference time window, the target ratio is pre-defined.

19. The base station according to claim 11, wherein the reference time window comprises a latest downlink transmission for which a HARQ feedback can be acquired prior to the Q1 time sub-pools, or the reference time window refers to resources occupied by the K1 radio signals in time domain.

20. The method according to claim 11, wherein the first radio signal is used for transmitting a first transport block, the first bit block is generated by the first transport block sequentially through segmentation, channel coding, rate matching, concatenation and scrambling.

* * * * *